(12) United States Patent
Vaughn et al.

(10) Patent No.: US 9,964,932 B2
(45) Date of Patent: May 8, 2018

(54) VIRTUAL DEMAND AUDITING OF DEVICES IN A BUILDING

(75) Inventors: Tyrell Craig Vaughn, Austin, TX (US); Colin Bester, Dripping Springs, TX (US)

(73) Assignee: Siemens Industry, Inc., Alpharetta, GA (US)

( * ) Notice: Subject to any disclaimer, the term of this patent is extended or adjusted under 35 U.S.C. 154(b) by 1533 days.

(21) Appl. No.: 13/494,757

(22) Filed: Jun. 12, 2012

(65) Prior Publication Data

US 2013/0331999 A1 Dec. 12, 2013

(51) Int. Cl.
*G06F 1/28* (2006.01)
*G05B 15/02* (2006.01)
*H02J 3/14* (2006.01)
*H02J 13/00* (2006.01)

(52) U.S. Cl.
CPC ............... *G05B 15/02* (2013.01); *H02J 3/14* (2013.01); *H02J 13/0006* (2013.01); *G05B 2219/2642* (2013.01); *Y02B 70/3225* (2013.01); *Y02B 70/3241* (2013.01); *Y04S 20/222* (2013.01); *Y04S 20/227* (2013.01)

(58) Field of Classification Search
CPC ........................................................ G06F 1/28
USPC ........................................................ 700/291
See application file for complete search history.

(56) References Cited

U.S. PATENT DOCUMENTS

| 7,610,425 | B2 | 10/2009 | Solomita et al. |
|---|---|---|---|
| 2007/0043970 | A1 | 2/2007 | Solomita et al. |
| 2008/0106424 | A1 | 5/2008 | Bouse et al. |
| 2011/0106316 | A1 | 5/2011 | Scott et al. |
| 2011/0251807 | A1* | 10/2011 | Rada ................. G01D 4/00 702/61 |
| 2011/0282504 | A1 | 11/2011 | Besore et al. |
| 2011/0302125 | A1* | 12/2011 | Shetty et al. ............. 706/52 |
| 2012/0123995 | A1* | 5/2012 | Boot ............ G01R 21/1333 706/54 |
| 2012/0158329 | A1* | 6/2012 | Hurri et al. ................ 702/62 |

FOREIGN PATENT DOCUMENTS

| CN | 101984358 A | 3/2011 |
|---|---|---|
| WO | 2011049905 A1 | 4/2011 |

OTHER PUBLICATIONS

PCT Search Report dated May 20, 2014, for PCT Application No. PCT/US2013/43828. (12 pages).
EP Search Report dated Apr. 5, 2016, for EP Application No. 13731549.5, 7 pages.
CN Office Action dated May 5, 2016, for CN Application No. 201380042728.4, 9 pages.

* cited by examiner

Primary Examiner — John Park (57) ABSTRACT

Automation systems, methods, and mediums. A method includes identifying a first amount of energy consumed by a plurality of devices in a building during a first period of time while a first device in the plurality of devices is in a first state to form a first baseline. The method includes identifying a second amount of energy consumed by the plurality of devices during a second period of time while the first device is in a second state. Additionally, the method includes generating an estimated energy consumption of the first device based on a difference between the first baseline and the second amount of energy consumed.

21 Claims, 5 Drawing Sheets

VIRTUAL DEMAND AUDITING OF DEVICES IN A BUILDING

TECHNICAL FIELD

The present disclosure is directed, in general, to automation systems and, more particularly, to virtual demand auditing of one or more devices in a building.

BACKGROUND OF THE DISCLOSURE

Building automation systems encompass a wide variety of systems that aid in the monitoring and control of various aspects of building operation. Building automation systems include security systems, fire safety systems, lighting systems, and HVAC systems. The elements of a building automation system are widely dispersed throughout a facility. For example, an HVAC system may include temperature sensors and ventilation damper controls, as well as other elements that are located in virtually every area of a facility. These building automation systems typically have one or more centralized control stations from which system data may be monitored and various aspects of system operation may be controlled and/or monitored.

To allow for monitoring and control of the dispersed control system elements, building automation systems often employ multi-level communication networks to communicate operational and/or alarm information between operating elements, such as sensors and actuators, and the centralized control station. One example of a building automation system is the Site Controls Controller, available from Siemens Industry, Inc. Building Technologies Division of Buffalo Grove, Ill. ("Siemens"). In this system, several control stations connected via an Ethernet or another type of network may be distributed throughout one or more building locations, each having the ability to monitor and control system operation.

Existing methods for measuring energy consumed by a device typically require installation of energy usage sensor that is connected to the circuitry of the device or manual measurements taken by an operator. These measurement methods can become costly and time consuming as the number of devices desired to be measured increases.

SUMMARY OF THE DISCLOSURE

Various disclosed embodiments relate to systems and methods for estimating energy consumption of a device in a building.

Various embodiments include automation systems, methods, and mediums. A method includes identifying a first amount of energy consumed by a plurality of devices in a building during a first period of time while a first device in the plurality of devices is in a first state to form a first baseline. The method includes identifying a second amount of energy consumed by the plurality of devices during a second period of time while the first device is in a second state. Additionally, the method includes generating an estimated energy consumption of the first device based on a difference between the first baseline and the second amount of energy consumed. In various embodiments, the method is performed in an energy management system that includes a single energy sensor disposed to measure energy consumed by the plurality of devices in the building and in an automation system disposed in or in proximity to the building and configured to control the first device to be in one of the first state and the second state. In other embodiments, the method is perfumed using a plurality of energy usage sensors where the energy usage measurements for the plurality of energy usage sensors are summed to measure energy consumed by the plurality of devices in the building.

The foregoing has outlined rather broadly the features and technical advantages of the present disclosure so that those skilled in the art may better understand the detailed description that follows. Additional features and advantages of the disclosure will be described hereinafter that form the subject of the claims. Those of ordinary skill in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device or system.

Embodiments of the present disclosure may measure energy consumption of one or more devices in a building utilizing an energy usage sensor that measures energy consumption at the building. Embodiments of the present disclosure utilize an automated process to estimate energy consumption of a device among several in a building to perform a "virtual measurement" of the energy consumption of the device. The use of a single energy usage sensor for a building to measure energy consumption of a single device may reduce the cost of installation for multiple sensors or the cost of having an operator manually measure each device's energy consumption. Some embodiments of the present disclosure may perform the virtual measurement using a plurality of energy usage sensors where the energy usage measurements for the plurality of energy usage sensors are summed. Embodiments of the present disclosure may measure each device in the building that is under the control of an energy management system (EMS) or building automation system (BAS) using one or more energy usage sensors.

Figure 1:
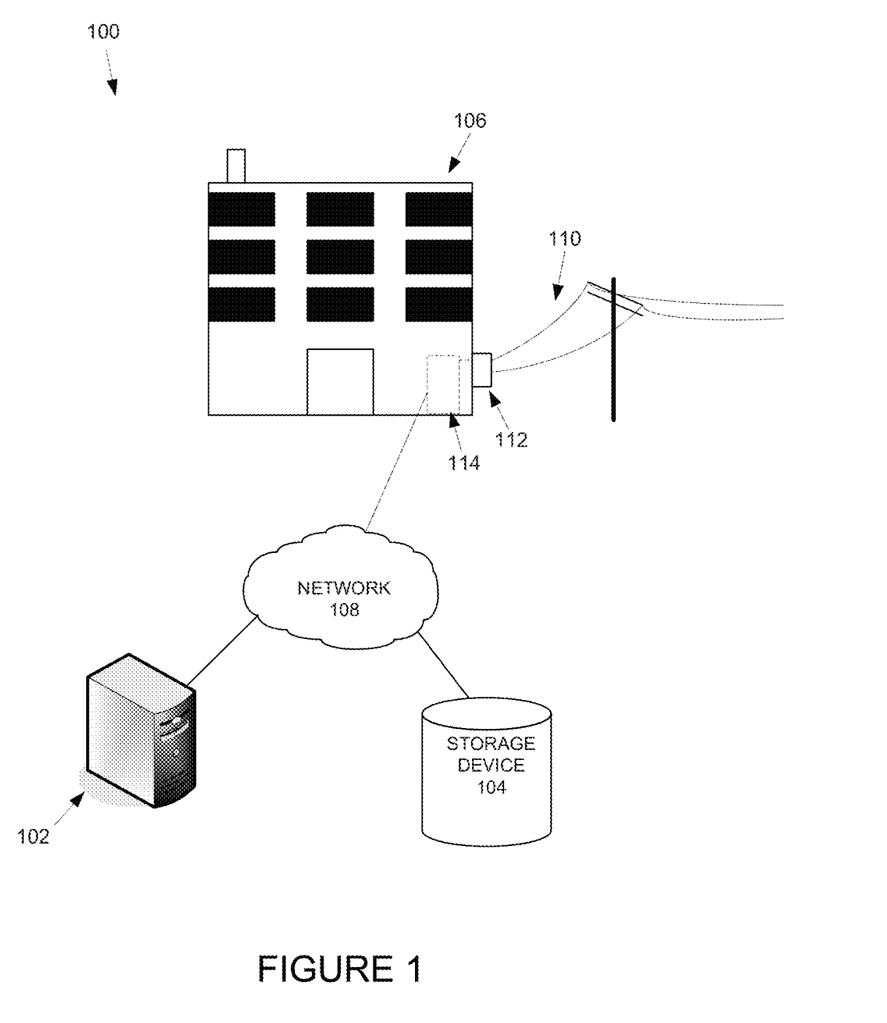
FIG. 1 illustrates a block diagram of an energy measurement system in which various embodiments of the present invention are implemented.

FIG. 1 illustrates a block diagram of an energy measurement system 100 in which various embodiments are implemented. In this illustrative embodiment, the energy measurement system 100 includes a data processing system 102 connected, via a network 108, to a storage device 104 and an automation system 114 disposed in or in proximity to a building 106. The network 108 is a medium used to provide communication links between various data processing systems and other devices in the energy measurement system 100. Network 108 may include any number of suitable connections, such as wired, wireless, or fiber optic links. Network 108 may be implemented as a number of different types of networks, such as, for example, the internet, a local area network (LAN), or a wide area network (WAN).

Elements of the present disclosure may be implemented in the data processing system 102 and the storage device 104 in connection with the network 108. For example, the data processing system 102 may utilize an automated process to estimate energy consumption of each controlled point within the building 106. For example, the automation system 114 controls one or more devices (not illustrated in FIG. 1) within the building 106. The controlled devices may include HVAC systems, lighting systems, security systems, and fire safety systems.

The data processing system 102 may estimate the energy consumption of each of the controlled devices within the building 106 using energy usage measurements for the entire building 106 received from a sensor 112. The data processing system 102 may receive measurements for energy usage from the building 106 via the network 108. For example, the building 106 receives electrical energy from an energy source (e.g., power lines 110). The sensor 112 measures an amount of energy received at the building 106. The automation system 114 at the building 106 receives the energy usage measurements from the sensor 112 and sends the energy usage measurements to the data processing system 102 via the network 108.

First, the data processing system 102 calculates an initial baseline for energy consumed by devices in the building 106. For example, the automation system 114 may hold all controlled devices in a constant state while receiving energy usage measurements from the sensor 112. The data processing system 102 receives these measurements and calculates the baseline for energy consumed at the building. The data processing system 102 may store this baseline in a database in storage device 104.

The data processing system 102 then sends an instruction for the automation system 114 to change the state of a controlled device. The data processing system 102 receives measurements for energy consumed at the building while the controlled device is in the changed state. The data processing system 102 then calculates the difference between the initial baseline and the energy consumed at the building while the controlled device is in the changed state. The data processing system 102 identifies this difference as an estimate or approximation of the energy consumption attributable to the controlled device having the changed state from when the initial baseline was calculated. The data processing system 102 may store the energy consumption of the device in a database in storage device 104. In this manner, the data processing system 102 is able to perform a virtual measurement of energy consumed by a controlled device while only needing actual measurements of energy consumed at the building. This process may be repeated for each of the controlled devices in the building 106.

In another embodiment, the process for estimating the energy consumption of the controlled device(s) may be performed by the automation system 114. For example the automation system 114 may include a data processing system that estimates the energy consumption of the controlled device(s). The automation system 114 may then send reports including the estimated energy consumption of the controlled device(s) over network 108 to the data processing system 102 for analysis processing or distribution to users or owner of the building.

Figure 2:
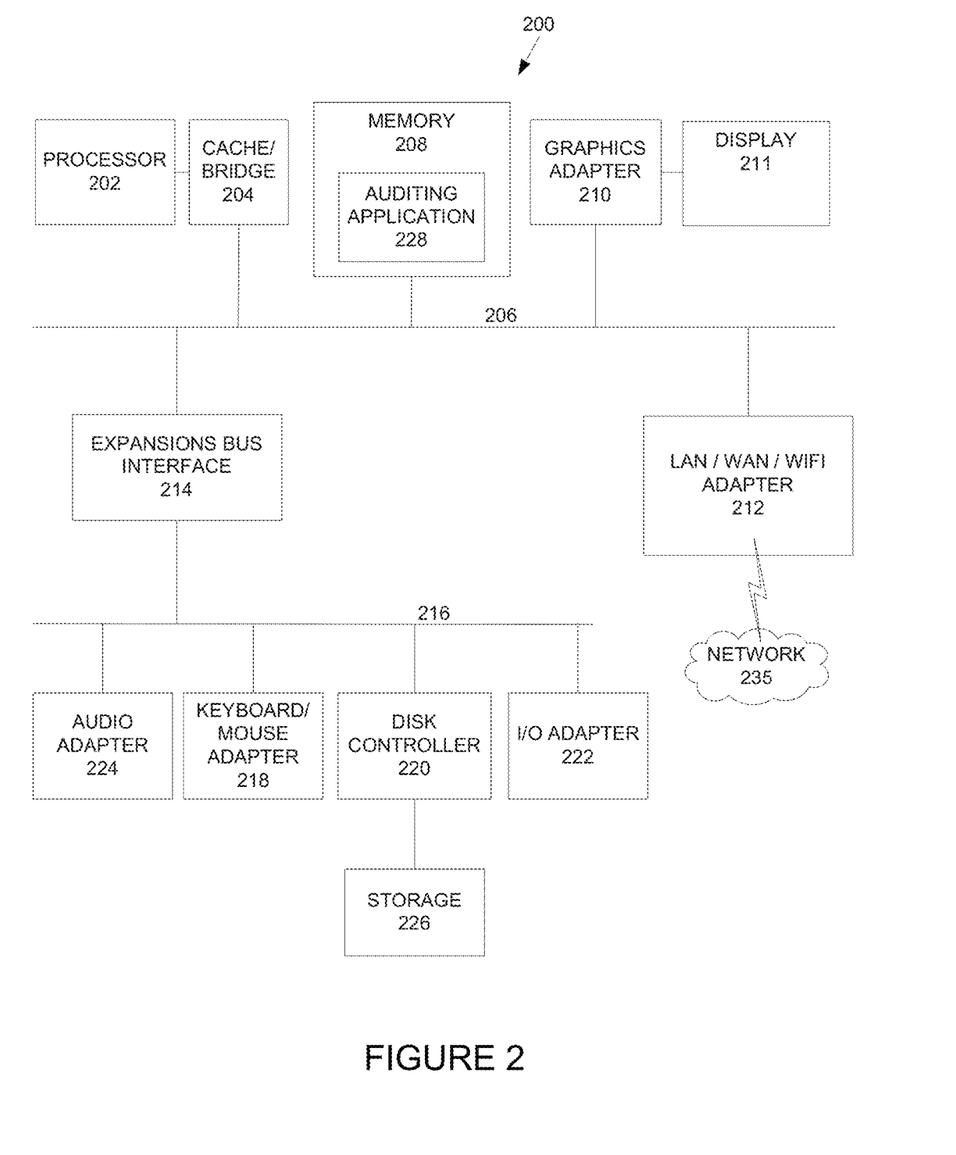
FIG. 2 illustrates a block diagram of a data processing system in which various embodiments of the present disclosure are implemented.

FIG. 2 depicts a block diagram of a data processing system 200 in which various embodiments are implemented. The data processing system 200 is an example of one implementation of the data processing system 102 in FIG. 1. The data processing system 200 is also an example of a data processing system that may be present within automation system 114 in FIG. 1. The data processing system 200 includes a processor 202 connected to a level two cache/bridge 204, which is connected in turn to a local system bus 206. The local system bus 206 may be, for example, a peripheral component interconnect (PCI) architecture bus. Also connected to local system bus in the depicted example are a main memory 208 and a graphics adapter 210. The graphics adapter 210 may be connected to a display 211.

Other peripherals, such as a local area network (LAN)/Wide Area Network/Wireless (e.g. WiFi) adapter 212, may also be connected to local system bus 206. An expansion bus interface 214 connects the local system bus 206 to an input/output (I/O) bus 216. The I/O bus 216 is connected to a keyboard/mouse adapter 218, a disk controller 220, and an I/O adapter 222. The disk controller 220 may be connected to a storage 226, which may be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to the I/O bus 216 in the example shown is an audio adapter 224, to which speakers (not shown) may be connected for playing sounds. The keyboard/mouse adapter 218 provides a connection for a pointing device (not shown), such as a mouse, trackball, trackpointer, etc. In some embodiments, the data processing system 200 may be implemented as a touch screen device, such as, for example, a tablet computer or touch screen panel. In these embodiments, elements of the keyboard/mouse adapter 218 may be implemented in connection with the display 211.

In various embodiments of the present disclosure, the data processing system 200 is a computer in the energy measurement system 100 that calculates energy consumption for one or more controlled devices in the building 106. For example, the auditing application 228 includes instructions that when executed by the processor 202 cause the data processing system 200 to perform the processes for calculating energy consumption for one or more controlled devices in the building 106.

Those of ordinary skill in the art will appreciate that the hardware depicted in FIG. 2 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

One of various commercial operating systems, such as a version of Microsoft Windows™, a product of Microsoft Corporation located in Redmond, Wash. may be employed if suitably modified. The operating system may modified or created in accordance with the present disclosure as described, for example, to implement virtual demand auditing of one or more devices in a building.

Figure 3:
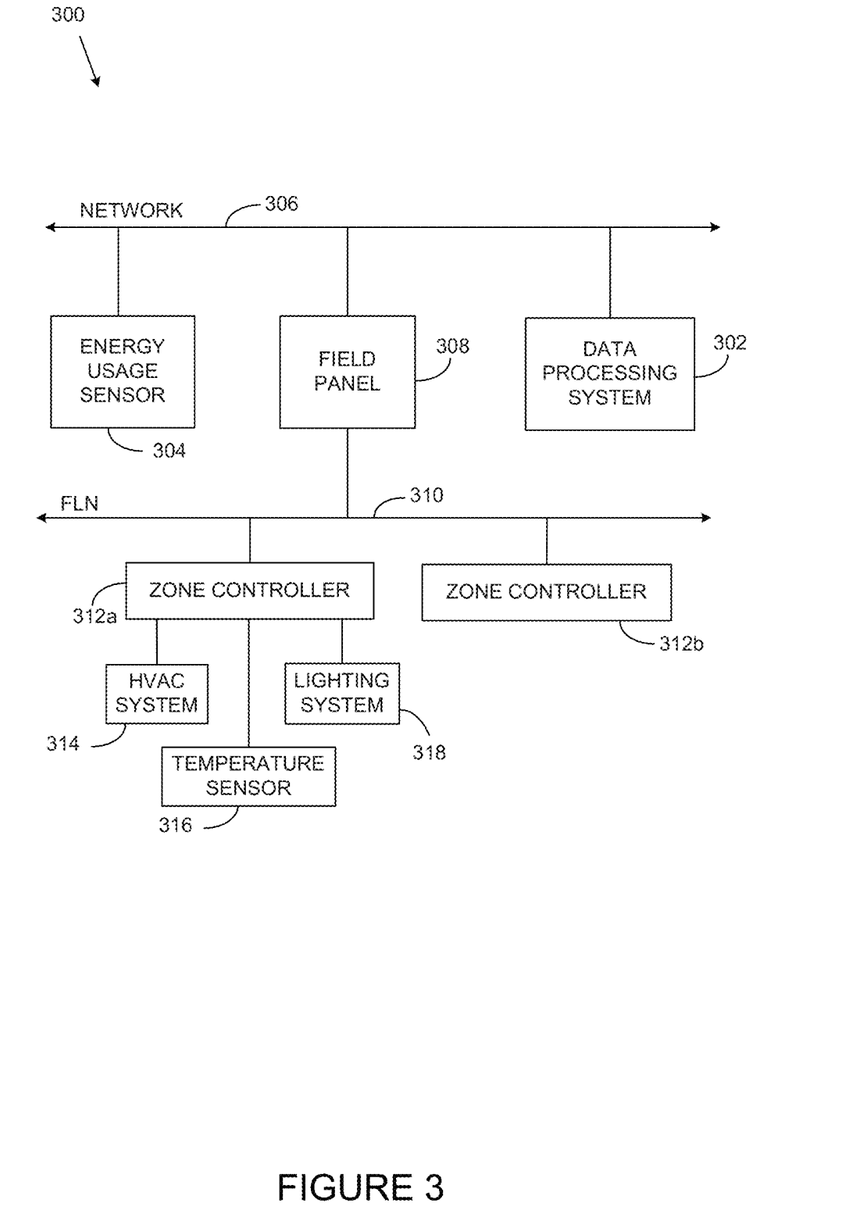
FIG. 3 illustrates a block diagram of an automation system in accordance with disclosed embodiments.

LAN/WAN/Wireless adapter 212 may be connected to a network 235, such as for example, network 306 in FIG. 3 (which shows that the network 306 is not a part of data processing system 200). As further explained below, the network 235 may be any public or private data processing system network or combination of networks, as known to those of skill in the art, including the Internet. Data processing system 200 may communicate over network 235 to one or more computers, which are also not part of data processing system 200, but may be implemented, for example, as a separate data processing system 200.

FIG. 3 illustrates a block diagram of an automation system 300 in which various embodiments are implemented. In these illustrative examples, the automation system 300 implements one or more functions for a building, such as the building 106 in FIG. 1. The automation system 300 may be an example of one embodiment of the sensor 112, the automation system 114, and/or the data processing system 200. For example, the automation system 300 may perform building automation, energy management, and energy usage measurement functions within the building 106. The automation system 300 may be located in the building 106, located remotely from the building 106 or include different components that are located inside 106 and remotely from the building 106.

The automation system 300 is capable of automated testing of one or more devices in the building 106 in accordance with the present disclosure. In this illustrative embodiment, the automation system 300 includes a data processing system 302, an energy usage sensor 304 and a field panel 308 connected by a network 306. For example, the network 306 may be a management level network (MLN) across one or more buildings or campus of buildings or management centers. In another example, the network 306 may be a building level network (BLN) connecting components located within the building 106. The energy usage sensor 304 is a sensor that measures energy consumed by devices at the building 106. For example, the energy usage sensor 304 may be a current transducer or an electricity meter for the building 106 that is disposed in or proximity to the building and relative to the main power lines 110 providing electricity to the building (as shown in FIG. 1) such that the energy usage sensor 304 is able to measure an amount of energy consumed by a plurality of devices within the building over a pre-determined period of time. In various embodiments, several energy usage sensors may be used to measure energy usage at various points in the building. For example, energy usage measurements from several energy usage sensors positioned at various points within or in proximity to the building may be summated into one virtual energy usage sensor in order to reflect the total amount of energy consumed by all the devices in the building.

In this illustrative example, the field panel 310 is connected to two zone controllers 312a-b (e.g., a digital zone controller, such as a thermostat controller and/or lighting control panel), and two field devices (HVAC system 314, temperature sensor 316, and lighting system 318) via field level network 310 (FLN). However, it will be understood that the system 300 may comprise any suitable number of these components without departing from the scope of this disclosure.

For some embodiments, a building or other area in which an HVAC system is implemented may comprise a single zone. For these embodiments, the system 300 may comprise a single zone controller 312, such as the zone controller 312a. However, for other embodiments, such as in a relatively large building, the building may comprise two or more zones. For example, in a retail store, the public area may comprise one zone, while a back storage area may comprise another zone. For the illustrated example, the system 300 comprises two such zones, each of which has a corresponding zone controller 312a-b. The zone controllers 312a-b control the field devices within their zone and may provide information regarding the state of the field devices to the field panel 308.

The HVAC system 314 may comprise a rooftop HVAC unit, an air handler unit, or any other suitable type of unit capable of providing heating, ventilation, and cooling for the building. In addition, it will be understood that the system 300 may comprise any combination of various types of HVAC systems. For example, the HVAC system 314 may comprise a rooftop HVAC unit, while the zone controller 312b may be coupled to another type of HVAC system such as a chiller plant that employs chilled water cooling and has variable speed motors that are field devices for controlling pumps and corresponding water flow within the chiller plant. The temperature sensor 316 is configured to sense the temperature of the zone associated with the zone controller 312a and to report the sensed temperature to the zone controller 312a. The lighting system 318 includes one or more lights under control of the zone controller 312a. The lighting system 318 may include proximity sensors and/or timers for automatically switching one or more lights on or off under certain sensed conditions.

The data processing system 302 is an example of the data processing system 200 in FIG. 2. For example, the data processing system 302 may calculate the energy consumption of field devices controlled by zone controllers 312a-b in automation system 300. For example, data processing system 302 may calculate the energy consumption of HVAC system 314 and lighting system 318 (and/or individual field devices therein) based on energy usage measurements from the energy usage sensor 304.

In one illustrative example, the data processing system 302 sends an instruction for field panel 308 to hold the controlled devices (e.g., HVAC system 314, lighting system 318 and/or a device therein) in a constant state for a pre-determined period of time. The pre-determined period of time may be based on an internal clock of the data processing system 302 or a time period defined by corresponding start and stop instructions received from the data processing system 302. For example, the controlled devices may be switched to an active or inactive state, or for the HVAC system, switched into a cooling state, heating state, a fan-only state, etc. The data processing system 302 system receives energy usage measurements from energy usage sensor 304 for total energy consumed at the building during a first period of time. For example, energy may be consumed by the HVAC system 314 and lighting system 318 while they are in an active state, and energy may be consumed by other devices in the building that are not under the control of the automation system 300. From these initial energy usage measurements, the data processing system 302 calculates a baseline of energy usage at the building for later comparison.

The data processing system 302 then switches the state of one of the controlled devices and repeats the process of receiving energy usage measurements during a second period of time. For example, lighting system 318 may be switched off for the baseline test and switched on for the test of the energy consumption of the lighting system 318. The data processing system 302 then calculates the difference between the baseline test and the test of the energy consumption of the lighting system 318. This calculated difference is an approximation or estimation of the energy consumed by the lighting system 318.

In another example, the lighting system 318 may have been switched on during the baseline test and switched off for the test of the energy consumption of the lighting system 318. The data processing system 302 then calculates the difference between the baseline test and the test of the energy consumption of the lighting system 318 as the approximation or estimation of the energy consumed by the lighting system 318. In this example, the energy consumption attributable to the lighting system 318 would be a decrease in energy consumption at the building while the lighting system 318 was switched off during the test of the energy usage of the lighting system 318.

In these illustrative embodiments, the data processing system 302 may perform several tests of the energy consumption of the tested device during several different periods of time to identify average values, peak values and minimum values for energy consumption by the tested device. For example, the data processing system 302 may perform one test then wait a predetermined period of time then perform another test to capture information about device performance during different periods of time. The data processing system 302 may cycle through each device controlled by the automation system 300 to test the energy consumption of each controlled device.

In some embodiments, the data processing system 302 may test different states of the same device. For example the HVAC system 314 may be tested during heating, full cooling, first stage cooling, and fan only states to identify energy consumption during each of these states. For example, the HVAC system 314 may be activated and forced into cooling by manipulating the setpoint of the HVAC system 314 well below the reported zone temperature. After a period of time when the HVAC system 314 is in a full cooling state, the data processing system 302 receives energy usage measurements for comparison with the initial baseline and calculation of the energy consumption of the HVAC system 314. This process may be repeated several times to identify average, peak and minimum values for energy consumption. This process may also be repeated for the heating, full cooling, first stage cooling, and fan only states by controlling the HVAC system 314 to enter the desired state and receiving energy usage measurements.

While various embodiments describe the testing for energy consumption being for a device, it is understood that a group of devices may be tested at the same time to determine energy consumption of the group of devices. For example, lighting system 318 may include several individual lights within a lighting fixture and several lighting fixtures within a circuit. The testing of lighting system 318 may include tests of individual lights, fixtures or circuits. Thus, the test may include a test of multiple devices.

During the baseline and the device tests, the automation system 300 holds the controlled devices in a constant state. The automation system 300 holds the devices in the constant state to reduce variations between the baseline and the device tests. In other words, the goal is for the only difference in energy usage between the baseline and the device tests to be energy usage attributable to the change in state of the tested device.

To test whether energy usage differences between the baseline and the device tests may be attributable to other devices besides the tested device, the data processing system 302 may calculate a second baseline after testing the tested device. For example, the automation system 300 controls the tested device to switch the tested device back to the state of the tested device during the initial baseline. The data processing system 302 then receives energy usage measurements during a third period of time and calculates a second baseline from these measurements. The data processing system 302 compares the initial baseline with the second baseline. If the difference between the initial baseline and the second baseline is outside a threshold value, the data processing system 302 may adjust the calculations for the estimation of the energy consumption by the tested device. For example, if the state of one of the other controlled devices changed, the data processing system 302 may adjust the calculations by considering the current results for the tested device unreliable, discarding the current results for energy consumption of the tested device and re-testing the previously tested device at a later time to ensure that the end results of the test are as accurate as possible.

In another example, the data processing system 302 may identify the difference between the initial baseline and the second baseline as energy consumption attributable to some other device and adjust up or down the estimation of the energy consumption by the tested device. For example, other devices, besides the devices controlled by the automation system 300 may be present inside the building. These other devices may change energy consumption states at any time between when the initial baseline and the second baseline are calculated. The data processing system 302 may run several baseline tests, even between tests for energy consumption of the tested device, to develop a more accurate baseline that takes into account changes in the devices that are not under control of the automation system 300. For example, the data processing system 302 may identify baseline energy consumption at the building as a function of time of day or year. The data processing system 302 may then calculate the energy consumption of the tested device based on the appropriate baseline for what time of day or year the device is tested or based on the baseline that was closest in time to the time that the device was tested.

Once the devices have been tested, the data processing system 302 may record results for storage in a database or distribution to appropriate administrators. The data processing system 302 may also compare the demand measured for each device against the historical demand of each device to detect changes in device energy consumption. For example, these changes may be used to identify a problem with the device or an opportunity to replace the device with a more energy efficient device. The data processing system 302 may also compare the demand measured for each device against an industry standard for the device type or original equipment manufacture's (OEM) specifications for the device to identify a problem with the device. The measured energy consumption values may also provide more accurate data for a demand-response bid. The measured energy consumption values may also help pin-point areas requiring maintenance, for example, where a device with an expected load is found to have no or less than standard measured difference from a baseline load.

Figure 4:
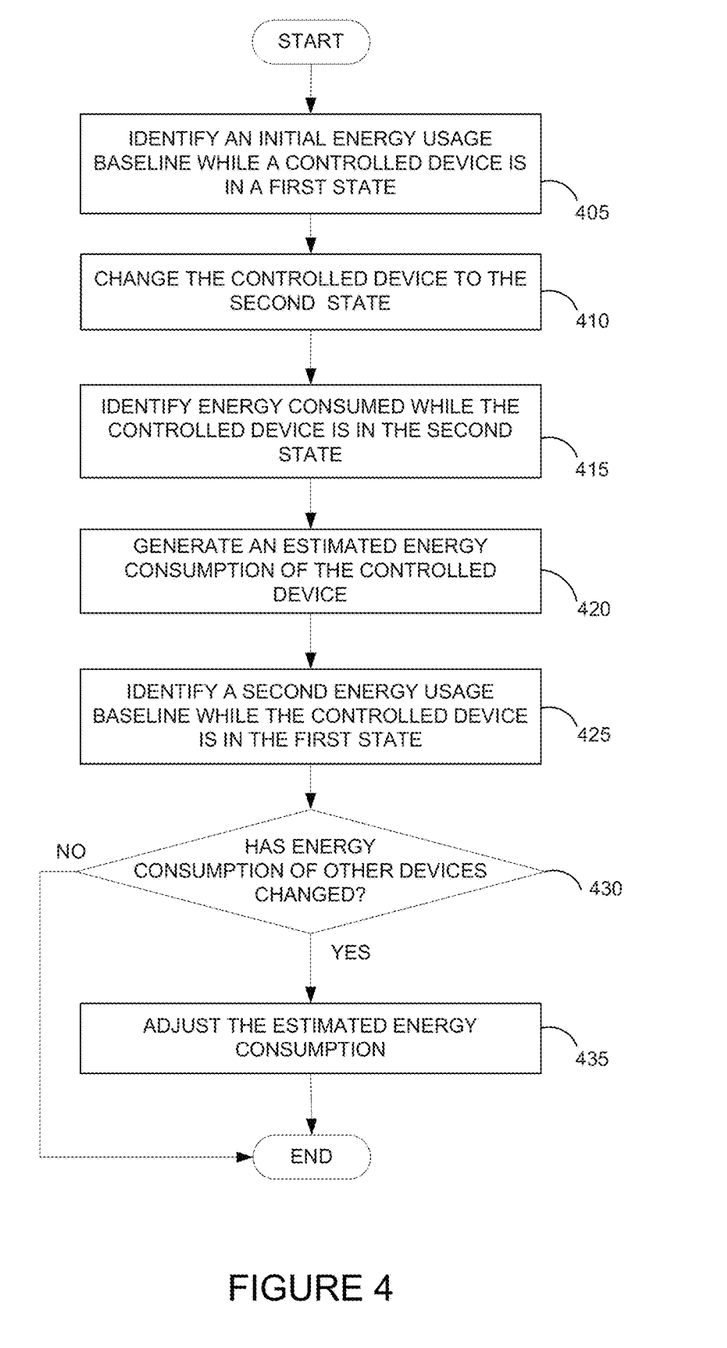
FIG. 4 illustrates depicts a flowchart of a process for estimating energy consumption of a device in accordance with disclosed embodiments.

FIG. 4 depicts a flowchart of a process for estimating energy consumption of a device in accordance with disclosed embodiments. This process may be performed, for example, in one or more data processing systems, such as, for example, the data processing system 200, configured to perform acts described below, referred to in the singular as "the system." The process may be implemented by executable instructions stored in a non-transitory computer-readable medium that cause one or more data processing systems to perform such a process. For example, the auditing application 228 may comprise the executable instructions to cause one or more data processing systems to perform such a process.

The process begins with the system identifying an initial energy usage baseline while a controlled device is in a first state (step 405). For example, the system may hold all the controlled devices in a respective constant initial state (which is a first state for the controlled device under test) and calculate the baseline from the total energy consumption at a building during a first period of time. The system changes the controlled device to the second state while leaving all other controlled devices in their initial state (step 410). For example, the system may switch the controlled device from an active state to an inactive state or vice versa and not switch the other controlled devices.

The system identifies energy consumed while the controlled device is in the second state (step 415). For example, the system receives energy usage measurements for energy consumed by all the devices at the building, including the controlled device under test, during a second period of time. The system generates an estimated energy consumption of the controlled device (step 420). The system may generate this estimation based on a difference between the initial energy usage baseline and the energy consumed during the second period of time while the controlled device is in the second state.

The system identifies a second energy usage baseline while the controlled device is in the first state (step 425). For example, the system calculates this baseline from energy usage measurements received during a third period of time after the controlled device was switched back to the first state. The system determines whether energy consumption of other devices changed (step 430). For example, the system compares the second baseline with the initial baseline to determine whether energy consumption of other devices in the plurality of devices changed during anytime between the first period of time and the third period of time.

If the system determines that the energy consumption of other devices changed, the system adjusts the estimated energy consumption of the first device (step 435). For example, the system may discard and retest the estimated energy consumption of the first device if the change in the baselines is greater than a threshold value. The system may also modify up or down the estimated energy consumption based on changes in the energy consumption of the other devices. If the system determines that the energy consumption of other devices did not change, the system has verified the estimated energy consumption of the controlled device and the process may terminate thereafter. The system may also repeat the process for the controlled device, for other states of the controlled device, or for other controlled devices several times to identify average, minimum and peak values for energy consumption.

Figure 5:
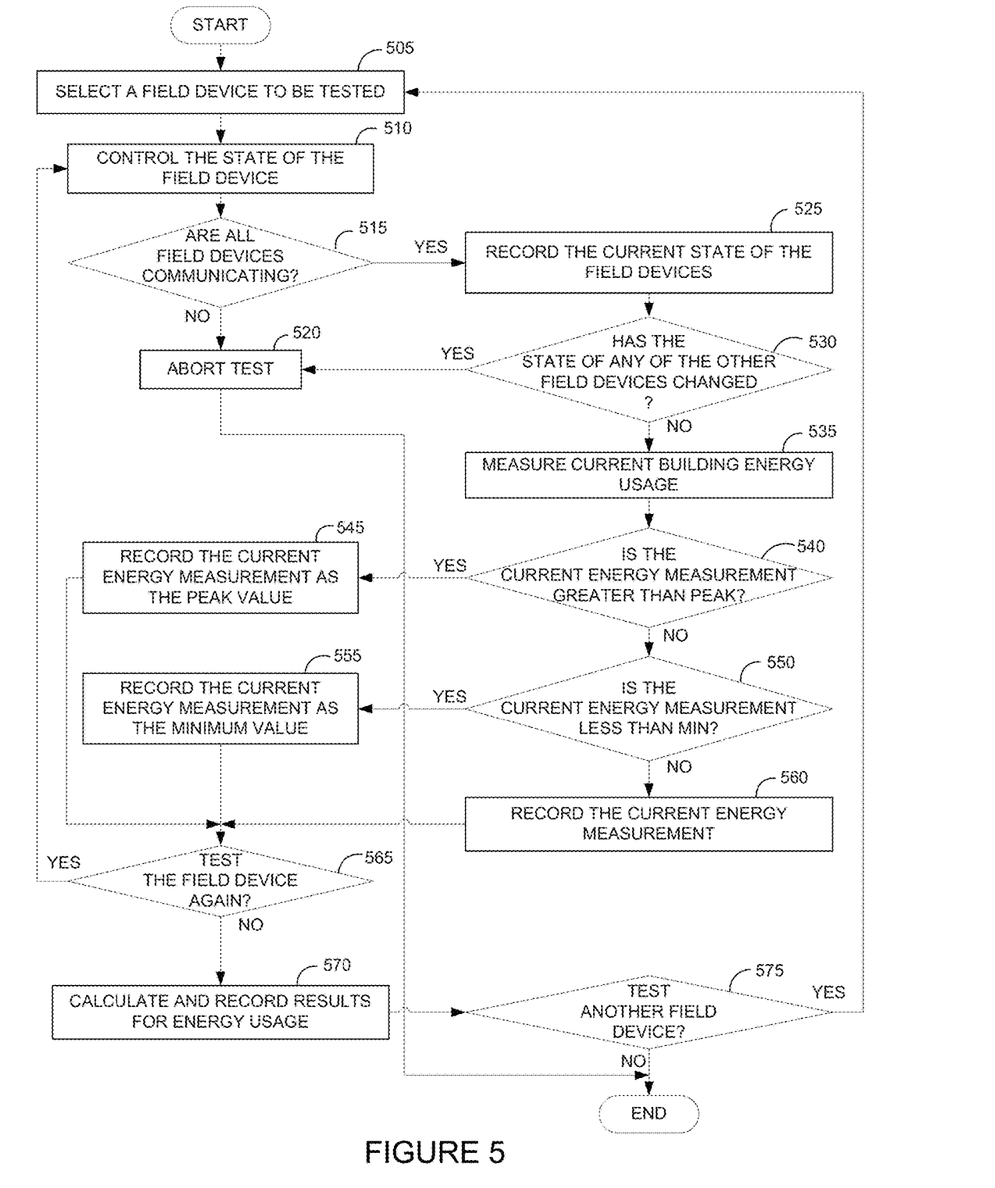
FIG. 5 depicts a flowchart of a process for virtual demand auditing of one or more devices in a building in accordance with disclosed embodiments.

FIG. 5 depicts a flowchart of a process for virtual demand auditing of one or more devices in a building in accordance with disclosed embodiments. The process depicted in FIG. 5 is an example of one implementation of steps 410, 415, and 420 in FIG. 4. For example, the process depicted in FIG. 5 illustrates details for testing energy consumption of one or more devices and/or device states. This process may be performed, for example, in one or more data processing systems, such as, for example, the data processing system 200, configured to perform acts described below, referred to in the singular as "the system." The process may be implemented by executable instructions stored in a non-transitory computer-readable medium that cause one or more data processing systems to perform such a process. For example, the auditing application 228 may comprise the executable instructions to cause one or more data processing systems to perform such a process.

The process begins with the system selecting a field device to be tested (step 505). The system controls the state of the field device (step 510). For example, the system may switch the state of the tested field device to a state that is different from the baseline test. In another example, the system may cycle through different states of the same device to test the different states. The system determines whether all field devices are communicating (step 515). For example, the system queries the field panel 308 to determine whether all controlled devices are properly communicating. If all the devices are not communicating, the system aborts the test (step 520) and ends processing for this instance of the process of FIG. 5. For example, the system may determine that without communication one or more devices may switch states compromising the accuracy of the test measurements.

If the devices are communicating, and in the desired run state, the system records the current state of each of the field devices (step 525). While all devices are held in their desired states, the system periodically determines whether the state of any of the other field devices has changed while energy data is gathered (step 530). If the state of the other devices has changed, the system aborts the test (step 520) and ends processing for this instance of the process of FIG. 5. For example, if the state of the devices is not held constant, the system may determine that results between different tests may not be consistent and could result in inaccurate measurements.

If the state of the devices has not changed, the system measures current building energy usage (step 535). For example, the system may receive, from the energy usage sensor 112 or 304, measurements for energy consumed in a period of time or the power consumption (e.g., in kW) at the building (i.e., the rate of energy consumption or energy consumption per second).

The system determines whether the current energy measurement is greater than current energy-usage peak value (step 540). For example, the system records running values for minimum (e.g., "kWMin"), peak (e.g., "kWPeak"), average (e.g., "kWAvg"), and starting (e.g., "startingkWh") energy consumption. If the current energy measurement is greater than current energy-usage peak value, the system records the current energy measurement as the current energy-usage peak value (step 545).

If the current energy measurement is not greater than current energy-usage peak value, the system determines whether the current energy measurement is less than current energy-usage minimum value (step 550). If the current energy measurement is less than current energy-usage minimum value, the system records the current energy measurement as the current energy-usage minimum value (step 555).

If the current energy measurement is not less than current energy-usage minimum value, the system records the current energy measurement (step 560). For example, if the present test is the first test for the device, the current instantaneous kW demand value(s) may be recorded as the minimum, peak, and average, and the starting values. If the present test is not the first test for the device and the current measured value is not the min or peak value, the value may be recorded to be used in a running calculation of the average value.

After recording the current measurement, the system determines whether to test the field device again (step 565). For example, the system may test the device a predetermined number of times. This predetermined number may be based on a desired accuracy needed in the testing of the device. In another example, the system may test the other states of the device. Thus, the system may determine whether all the states of the device have been tested. If the system determines to test the field device again, the system returns to step 510 to continue testing the device. For example, the system may switch the field device or controlled device under test from the initial or first state associated with such device to a second state (such as an active state or another operational state, such as a fan only state from a cooling state for an HVAC system that is the controlled device under test).

If the system determines not to test the field device again, the system calculates and records results for energy usage of the tested field device (step 570). For example, the system may subtract the measured energy usage from the baseline from the building to identify an estimation of the energy consumption attributable to the tested device. This estimation may include values for minimum, peak, and average energy consumption of one or more states of one or more devices. These values are recorded as results and may be stored as an output or distributed to system administrators.

The system determines whether to test another field device (step 575). If the system determines to test another field device, the system returns to step 505 to select the field device to be tested. If the system determines not to test another field device, the process terminates thereafter.

Disclosed embodiments provide an automated process to perform a virtual measurement of the energy consumption of a single device or group of devices from among several in a building. Various embodiments of the present disclosure may perform this virtual measurement using a single energy usage sensor for the building. The use of a single energy usage sensor for a building to measure energy consumption of a single device may reduce the cost of installation for multiple sensors or the cost of having an operator manually measure each device's energy consumption. Some embodiments of the present disclosure may perform the virtual measurement using a plurality of energy usage sensors where the energy usage measurements for the plurality of energy usage sensors are summed. Further, embodiments of the present disclosure may measure energy usage of multiple devices within the building. The energy usage of each device may be periodically measured to monitor device energy usage, health and performance in an efficient and cost effective manner.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 200 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC § 112 unless the exact words "means for" are followed by a participle.

What is claimed is:

1. A method in a data processing system for estimating energy consumption, the method comprising:
   identifying a first amount of energy consumed by a plurality of devices in a building during a first period of time while a first device in the plurality of devices is in a first state to form a first baseline;
   after the first period of time, identifying a second amount of energy consumed by the plurality of devices during a second period of time while the first device is in a second state;
   generating an estimated energy consumption of the first device based on a difference between the first baseline and the second amount of energy consumed;

after the second period of time, changing the second state of the first device back to the first state and identifying a third amount of energy consumed by the plurality of devices during a third period of time while the first device is in the first state to form a second baseline;

comparing the second baseline with the first baseline to determine whether there was a change in energy consumption of other devices than the first device in the plurality of devices between the first period of time and the third period of time; and adjusting the estimated energy consumption of the first device based on changes in the energy consumption of the other devices in the plurality of devices in response to determining that the energy consumption of the other devices in the plurality of devices changed.

2. The method of claim 1 further comprising:

changing the first state of the first device to the second state in response to identifying the first baseline; and holding other devices in the plurality of devices in a constant state during the first and second periods of time.

3. The method of claim 1, wherein the second state is an active state, the method further comprising:

performing multiple tests for energy consumed by the plurality of devices during different periods of time while the first device is in the active state; and identifying average, peak and minimum values for energy consumption by the first device based on the multiple tests.

4. A method in a data processing system for estimating energy consumption, the method comprising:

identifying a first amount of energy consumed by a plurality of devices in a building during a first period of time while a first device in the plurality of devices is in a first state to form a first baseline;

after the first period of time, identifying a second amount of energy consumed by the plurality of devices during a second period of time while the first device is in a second state;

generating an estimated energy consumption of the first device based on a difference between the first baseline and the second amount of energy consumed;

after the second period of time, changing the second state of the first device back to the first state and identifying a third amount of energy consumed by the plurality of devices during a third period of time while the first device is in the first state to form a second baseline;

comparing the second baseline with the first baseline to determine whether there was a change in energy consumption of other devices than the first device in the plurality of devices between the first period of time and the third period of time;

determining whether a state of one of the other devices in the plurality of devices changed between the first period of time and the third period of time; and repeating identification of energy consumed while the first device is in the second state to determine the estimated energy consumption of the first device in response to determining that the state of the one of the other devices changed.

5. The method of claim 1, wherein the second state is a first active state and wherein the estimated energy consumption of the first device is a first estimated energy consumption of the first device for the first active state, the method further comprising:

identifying a third amount of energy consumed by the plurality of devices during a third period of time while the first device is in a second active state; and generating a second estimated energy consumption of the first device for the second active state based on a difference between the first baseline and the third amount of energy consumed.

6. The method of claim 5, wherein the first device is a heating, ventilation, and air-conditioning (HVAC) system, and wherein the first active state and the second active state are selected from a group comprising a heating state, a cooling state, and a fan-only state.

7. The method of claim 1 further comprising:

receiving measurements for the first amount of energy consumed from a plurality of energy sensors disposed to measure energy consumed by the plurality of devices in the building; and summing the received measurements from each of the plurality of energy sensors to identify the first amount of energy consumed by the plurality of devices in the building.

8. The method of claim 1 further comprising:

receiving measurements for the first and second amounts of energy consumed from a single energy sensor disposed to measure total energy consumed by the plurality of devices in the building.

9. A data processing system configured to estimate energy consumption, the data processing system comprising:

a storage device comprising an auditing application;

an accessible memory comprising instructions of the auditing application; and a processor configured to execute the instructions of the auditing application to:

identify a first amount of energy consumed by a plurality of devices in a building during a first period of time while a first device in the plurality of devices is in a first state to form a first baseline;

after the first period of time, identify a second amount of energy consumed by the plurality of devices during a second period of time while the first device is in a second state;

generate an estimated energy consumption of the first device based on a difference between the first baseline and the second amount of energy consumed;

after the second period of time, change the second state of the first device back to the first state and identify a third amount of energy consumed by the plurality of devices during a third period of time while the first device is in the first state to form a second baseline;

compare the second baseline with the first baseline to determine whether there was a change in energy consumption of other devices than the first device in the plurality of devices between the first period of time and the third period of time; and adjust the estimated energy consumption of the first device based on changes in the energy consumption of the other devices in the plurality of devices in response to determining that the energy consumption of the other devices in the plurality of devices changed.

10. The data processing system of claim 9, wherein the processor is further configured to execute the instructions of the auditing application to:

change the first state of the first device to the second state in response to identifying the first baseline; and hold other devices in the plurality of devices in a constant state during the first and second periods of time.

11. The data processing system of claim 9, wherein the second state is an active state and the processor is further configured to execute the instructions of the auditing application to:
perform multiple tests for energy consumed by the plurality of devices during different periods of time while the first device is in the active state; and
identify average, peak and minimum values for energy consumption by the first device based on the multiple tests.

12. A data processing system configured to estimate energy consumption, the data processing system comprising:
a storage device comprising an auditing application;
an accessible memory comprising instructions of the auditing application; and
a processor configured to execute the instructions of the auditing application to:
identify a first amount of energy consumed by a plurality of devices in a building during a first period of time while a first device in the plurality of devices is in a first state to form a first baseline;
after the first period of time, identify a second amount of energy consumed by the plurality of devices during a second period of time while the first device is in a second state;
generate an estimated energy consumption of the first device based on a difference between the first baseline and the second amount of energy consumed;
after the second period of time, change the second state of the first device back to the first state and identify a third amount of energy consumed by the plurality of devices during a third period of time while the first device is in the first state to form a second baseline;
compare the second baseline with the first baseline to determine whether there was a change in energy consumption of other devices than the first device in the plurality of devices between the first period of time and the third period of time;
determine whether a state of one of the other devices in the plurality of devices changed between the first period of time and the third period of time; and
repeat identification of energy consumed while the first device is in the second state to determine the estimated energy consumption of the first device in response to determining that the state of the one of the other devices changed.

13. The data processing system of claim 9, wherein the second state is a first active state, wherein the estimated energy consumption of the first device is a first estimated energy consumption of the first device for the first active state, and wherein the processor is further configured to execute the instructions of the auditing application to:
identify a third amount of energy consumed by the plurality of devices during a third period of time while the first device is in a second active state; and
generate a second estimated energy consumption of the first device for the second active state based on a difference between the first baseline and the third amount of energy consumed.

14. The data processing system of claim 13, wherein the first device is a heating, ventilation, and air-conditioning (HVAC) system, and wherein the first active state and the second active state are selected from a group comprising a heating state, a cooling state, and a fan-only state.

15. The data processing system of claim 9, wherein the processor is further configured to execute the instructions of the auditing application to:
receive measurements for the first amount of energy consumed from a plurality of energy sensors disposed to measure energy consumed by the plurality of devices in the building; and
sum the received measurements from each of the plurality of energy sensors to identify the first amount of energy consumed by the plurality of devices in the building.

16. The data processing system of claim 9, wherein the processor is further configured to execute the instructions of the auditing application to:
receive measurements for the first and second amounts of energy consumed from a single energy sensor disposed to measure total energy consumed by the plurality of devices in the building.

17. A non-transitory computer-readable medium encoded with executable instructions that, when executed, cause one or more data processing systems to:
identify a first amount of energy consumed by a plurality of devices in a building during a first period of time while a first device in the plurality of devices is in a first state to form a first baseline;
after the first period of time, identify a second amount of energy consumed by the plurality of devices during a second period of time while the first device is in a second state;
generate an estimated energy consumption of the first device based on a difference between the first baseline and the second amount of energy consumed;
after the second period of time, change the second state of the first device back to the first state and identify a third amount of energy consumed by the plurality of devices during a third period of time while the first device is in the first state to form a second baseline;
compare the second baseline with the first baseline to determine whether there was a change in energy consumption of other devices than the first device in the plurality of devices between the first period of time and the third period of time; and
adjust the estimated energy consumption of the first device based on changes in the energy consumption of the other devices in the plurality of devices in response to determining that the energy consumption of the other devices in the plurality of devices changed.

18. The non-transitory computer-readable medium of claim 17, wherein the computer-readable medium is further encoded with executable instructions that, when executed, cause one or more data processing systems to:
change the first state of the first device to the second state in response to identifying the first baseline; and
hold other devices in the plurality of devices in a constant state during the first and second periods of time.

19. The non-transitory computer-readable medium of claim 17, wherein the second state is an active state and the computer-readable medium is further encoded with executable instructions that, when executed, cause one or more data processing systems to:
perform multiple tests for energy consumed by the plurality of devices during different periods of time while the first device is in the active state; and
identify average, peak and minimum values for energy consumption by the first device based on the multiple tests.

20. A non-transitory computer-readable medium encoded with executable instructions that, when executed, cause one or more data processing systems to:
- identify a first amount of energy consumed by a plurality of devices in a building during a first period of time while a first device in the plurality of devices is in a first state to form a first baseline;
- after the first period of time, identify a second amount of energy consumed by the plurality of devices during a second period of time while the first device is in a second state;
- generate an estimated energy consumption of the first device based on a difference between the first baseline and the second amount of energy consumed;
- after the second period of time, change the second state of the first device back to the first state and identify a third amount of energy consumed by the plurality of devices during a third period of time while the first device is in the first state to form a second baseline;
- compare the second baseline with the first baseline to determine whether there was a change in energy consumption of other devices than the first device in the plurality of devices between the first period of time and the third period of time;
- determine whether a state of one of the other devices in the plurality of devices changed between the first period of time and the third period of time; and
- repeat identification of energy consumed while the first device is in the second state to determine the estimated energy consumption of the first device in response to determining that the state of the one of the other devices changed.

21. The non-transitory computer-readable medium of claim 17, wherein the second state is a first active state, wherein the estimated energy consumption of the first device is a first estimated energy consumption of the first device for the first active state, and wherein the computer-readable medium is further encoded with executable instructions that, when executed, cause one or more data processing systems to:
- identify a third amount of energy consumed by the plurality of devices during a third period of time while the first device is in a second active state; and
- generate a second estimated energy consumption of the first device for the second active state based on a difference between the first baseline and the third amount of energy consumed.

* * * * *